US009738306B2

(12) United States Patent
Barbat et al.

(10) Patent No.: US 9,738,306 B2
(45) Date of Patent: Aug. 22, 2017

(54) ENERGY ABSORBING STEERING COLUMN ASSEMBLY

(71) Applicant: Ford Global Technologies, LLC, Dearborn, MI (US)

(72) Inventors: Saeed David Barbat, Novi, MI (US); Michael James Whitens, Milford, MI (US); Mohamed Ridha Baccouche, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 14/945,527

(22) Filed: Nov. 19, 2015

(65) Prior Publication Data

US 2017/0144691 A1    May 25, 2017

(51) Int. Cl.
*B62D 1/19*    (2006.01)
*B60R 21/00*   (2006.01)

(52) U.S. Cl.
CPC .............. *B62D 1/192* (2013.01); *B60R 21/00* (2013.01); *B60R 2021/0004* (2013.01)

(58) Field of Classification Search
CPC .. B62D 1/192; B60R 21/00; B60R 2021/0004
See application file for complete search history.

(56) References Cited

U.S. PATENT DOCUMENTS

| 3,461,740 | A | * | 8/1969 | Shigeru | ................ | B62D 1/192 180/78 |
| 3,487,710 | A | | 1/1970 | Fergie | | |
| 3,744,338 | A | * | 7/1973 | Komatsu | ................ | B62D 1/192 188/374 |
| 3,776,062 | A | * | 12/1973 | Ito | .......................... | B62D 1/192 74/492 |
| 3,798,994 | A | * | 3/1974 | Hollins | .................... | B62D 1/11 180/90 |
| 3,943,793 | A | * | 3/1976 | Stedman | ................ | B62D 1/192 188/268 |
| 4,531,619 | A | * | 7/1985 | Eckels | .................... | B62D 1/192 188/371 |
| 4,541,299 | A | * | 9/1985 | Kanaya | ................. | B62D 1/184 280/775 |

(Continued)

FOREIGN PATENT DOCUMENTS

| FR | 3001429 | 8/2014 |
| JP | 201473805 | 4/2014 |
| WO | WO 02053445 | 7/2002 |

*Primary Examiner* — Darlene P Condra
(74) *Attorney, Agent, or Firm* — Jason Rogers; Bejin Bieneman PLC

(57) ABSTRACT

A steering column assembly for a vehicle includes a housing defining a bore that extends along an axis. The steering column assembly includes a first shaft disposed in the bore and a second shaft telescopically engaged with the first shaft. The second shaft is movable along the axis relative to the housing. A wedge is fixed to the second shaft and is spaced from the housing. During frontal impact of the vehicle, an occupant may impact the steering column assembly. Relative telescopic retraction of the first shaft and the second shaft provides a first stage of energy absorption. As the first shaft and the second shaft telescopically retract, the wedge contacts the housing and deforms the housing in a second stage of energy absorption.

20 Claims, 3 Drawing Sheets

(56) References Cited

U.S. PATENT DOCUMENTS

| | | | | |
|---|---|---|---|---|
| 5,368,330 | A | | 11/1994 | Arnold et al. |
| 5,588,332 | A | * | 12/1996 | Hedderly .............. B62D 1/195 188/371 |
| 5,954,363 | A | * | 9/1999 | Cymbal ................ B62D 1/195 280/777 |
| 2014/0190762 | A1 | * | 7/2014 | Kiyota ................ B62D 5/0409 180/444 |
| 2015/0069747 | A1 | * | 3/2015 | Sharman ............... B62D 1/195 280/777 |

* cited by examiner

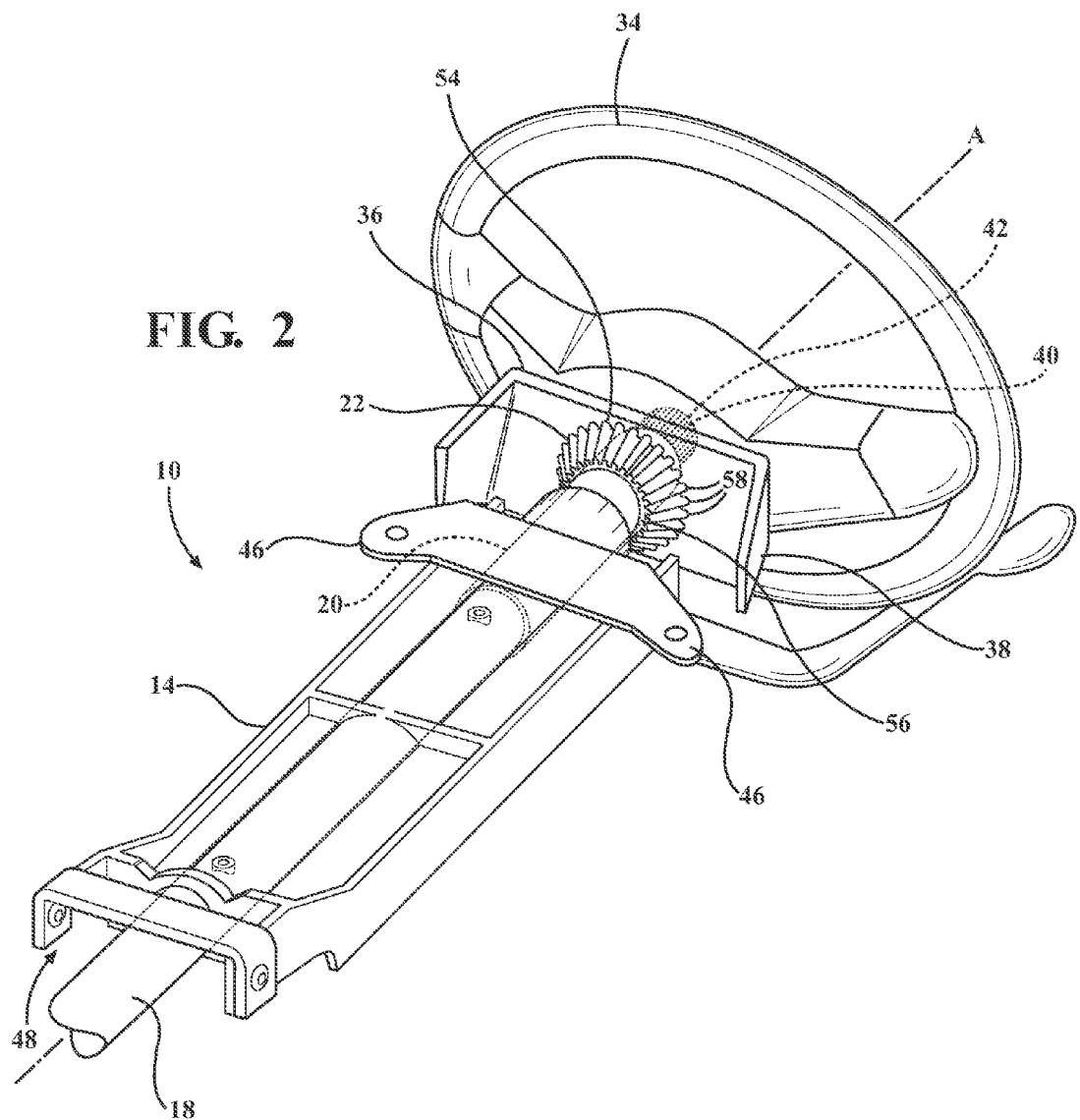

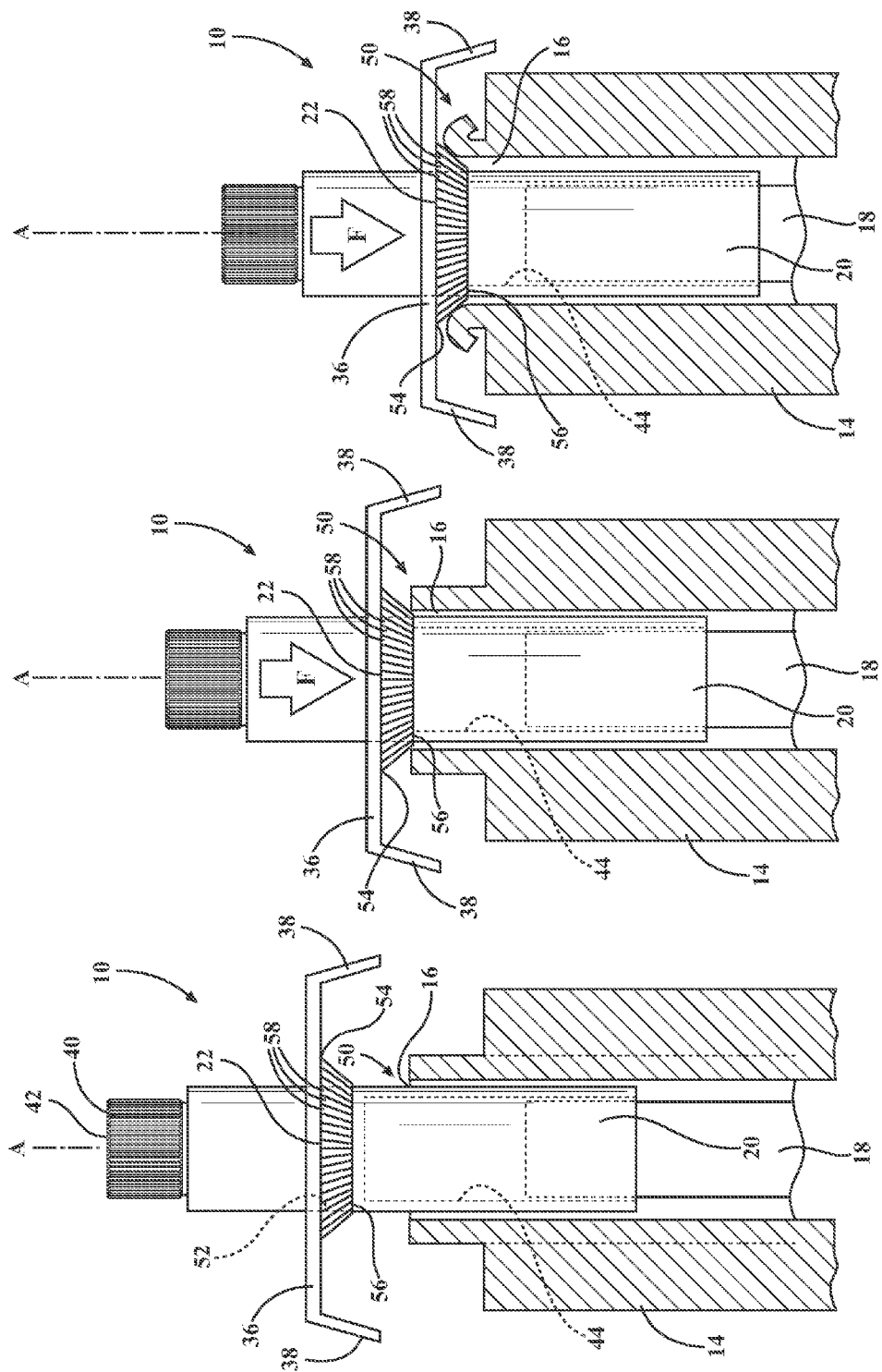

ENERGY ABSORBING STEERING COLUMN ASSEMBLY

BACKGROUND

A steering system of a vehicle includes steering column assembly mounted to an instrument panel of a vehicle. Specifically, the steering column assembly may include a housing mounted to the instrument panel. The housing supports one or more steering shafts that link a steering wheel to another component of the steering system. The steering shaft may rotate relative to the housing.

During a frontal impact of the vehicle, an occupant may impact the steering column assembly, e.g., the steering wheel. There remains an opportunity to design the steering column assembly that may absorb energy from the impact of the occupant against the steering column assembly.

BRIEF DESCRIPTION OF THE DRAWINGS

FIG. 2 is a perspective view of the steering column assembly.

FIG. 3A is a cross-sectional view of the steering column assembly in the absence of an impact force.

FIG. 3B is a cross-sectional view of the steering column assembly in a first stage of energy absorption.

FIG. 3C is a cross-sectional view of the steering column assembly in a second stage of energy absorption.

DETAILED DESCRIPTION

Figure 1:
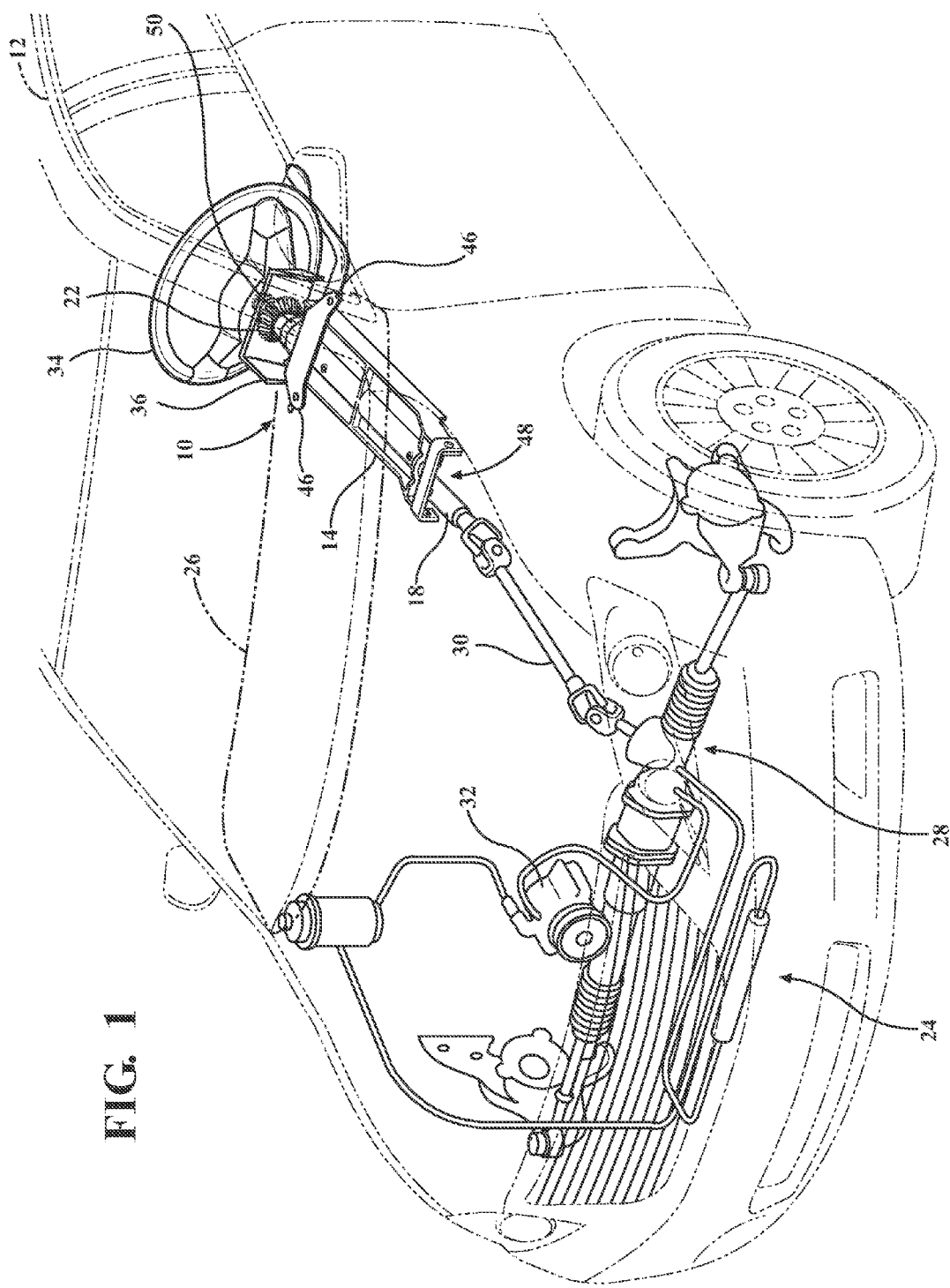
FIG. 1 is a perspective view of a vehicle including a steering column assembly.

With reference to the Figures, wherein like numerals indicate like parts throughout the several views, a steering column assembly 10 for a vehicle 12 includes a housing 14 defining a bore 16 that extends along an axis A. A first shaft 18 is disposed in the bore 16 and a second shaft 20 is engaged telescopically with the first shaft 18 and movable along the axis A relative to the housing 14. A wedge 22 is fixed to the second shaft 20 and is spaced from the housing 14.

During a front end impact of the vehicle 12, an occupant of the vehicle 12 may be forced in a forward direction and impact the steering column assembly 10. The first shaft 18 and the second shaft 20 may telescopically retract relative to each other during the impact of the occupant against the steering column assembly 10 to absorb energy from the occupant. This telescopic retraction of the first shaft 18 and the second shaft 20 allows the occupant to move forward while also absorbing energy from the occupant to cushion the impact between the occupant and the steering column. Additionally, as the first shaft 18 and the second shaft 20 telescopically retract relative to each other, the wedge 22 moves toward the housing 14. As the wedge 22 approaches the housing 14, the wedge 22 contacts the housing 14 and deforms the housing 14 to absorb energy from the occupant. In other words, the steering column assembly 10 absorbs energy from the occupant in two stages. Specifically, in a first stage, the telescopic retraction of the first shaft 18 and the second shaft 20 allows the occupant to move forward and absorbs energy from the occupant, and in a second stage, the deformation of the housing 14 by the wedge 22 absorbs energy from the occupant. In this configuration, the first stage and the second stage of energy absorption can be independently tuned.

With reference to FIG. 1, the vehicle 12 includes a steering system 24 including the steering column assembly 10. The vehicle 12 may include an instrument panel 26 that supports the steering column assembly 10. Specifically, the instrument panel 26 may be connected to and may support the housing 14.

The steering system 24 may be a mechanical system. In such a configuration, the steering system 24 may include a rack-and-pinion 28 coupled to the second shaft 20. Specifically, an intermediate shaft 30 may connect the first shaft 18 to the rack-and-pinion 28. The steering system 24 may include a power steering pump 32 connected to the rack-and-pinion 28, and other suitable components of typical steering systems. In another configuration, the steering system 24 may be an electrical system or a mechanical-electric system, e.g., a drive-by-wire system.

With reference to FIG. 1, the steering column assembly 10 includes a steering wheel 34. The steering wheel 34 may be of any suitable type and formed of any suitable material.

The steering column assembly 10 includes a steering wheel support 36 fixed to the second shaft 20. The steering wheel support 36 supports the steering wheel 34 and may connect the steering wheel 34 to the second shaft 20. The steering wheel support 36 is fixed to the second shaft 20 in any suitable way, e.g., by welding, fastening, etc. The steering wheel support 36 may support trim (not shown).

The steering wheel support 36 is spaced from the housing 14 when the second shaft 20 is in an extended position relative to the first shaft 18, as set forth further below, i.e., prior to impact of the steering column assembly 10 by the occupant. The steering wheel support 36 moves relative to the housing 14, e.g., the steering wheel support 36 moves toward the housing 14 when the occupant impacts the steering column assembly 10. Specifically, the steering wheel support 36 may move together with the second shaft 20 as a unit.

The steering wheel support 36 may extend in a direction transverse to the axis A. The steering wheel support 36 may include a plurality of flanges 38 and/or fastening regions for engaging components, e.g., the steering wheel 34, a shroud, trim, etc., to the second shaft 20. The steering wheel support 36 may be formed of any suitable material, e.g., plastic, metal, etc.

The second shaft 20 may have a stud 40 that extends from the steering wheel support 36 and that is configured to support the steering wheel 34. The stud 40 may include a splined end 42 for supporting the steering wheel 34.

As set forth above, the first shaft 18 and the second shaft 20 are telescopically engaged. In other words, at least one of the first shaft 18 and the second shaft 20 has a shaft bore 44 that receives the other of the first shaft 18 and the second shaft 20. Specifically, the first shaft 18 may define the shaft bore 44 and receive the second shaft 20 in the shaft bore 44 as shown in FIGS. 3A-C. Alternatively, the second shaft 20 may define the shaft bore 44 and receive the first shaft 18 (not shown).

With reference to FIGS. 3A-C, the second shaft 20 is moveable along the axis A relative to the first shaft 18 when the occupant impacts the steering column assembly 10. Specifically, the first shaft 18 telescopically retracts into the shaft bore 44 of the second shaft 20 when the second shaft 20 moves toward the first shaft 18. In other words, the second shaft 20 may be moveable relative to the first shaft 18 from an extended position as shown in FIG. 3A, i.e., before impact of the occupant against the steering column assembly 10, to a retracted position, as shown in FIG. 3B, when the steering column assembly 10 is impacted by the occupant.

The first shaft 18 and the second shaft 20 are frictionally engaged in the shaft bore 44. As such, the friction between the first shaft 18 and the second shaft 20 during the telescopic retraction of the first shaft 18 and the second shaft 20 absorbs energy from the occupant to cushion the impact between the occupant and the steering column assembly 10. For example, the telescopic retraction of the first shaft 18 and the second shaft 20 relative to each other may be configured to generate friction force of 3000-5000 N. Prior to the wedge 22 engaging the housing 14, the telescopic retraction of the first shaft 18 and the second shaft 20 and the frictional energy absorption between the first shaft 18 and the second shaft 20 defines the first stage of the two stage energy absorption. The second stage of the energy absorption, as described further below, occurs when the wedge 22 engages the housing 14.

The friction generated between the first shaft 18 and the second shaft 20 as the first shaft 18 and the second shaft 20 telescopically retract relative to each other may be designed by altering characteristics, e.g., such as the material, surface structure, shape, etc., of at least one of the first shaft 18 and the second shaft 20. As such, the amount of energy absorbable by the assembly is tunable.

Occupant input to the steering wheel 34, e.g., steering wheel 34 rotation, may be transferred through the first shaft 18 and the second shaft 20 to other components of the steering system 24, e.g., the intermediate shaft 30, the rack-and-pinion 28, etc. The first shaft 18 and the second shaft 20 may be made of any suitable material, e.g., metal, steel, etc.

As set forth above, the housing 14 may be connected to the instrument panel 26. Specifically, the housing 14 may include a plurality of fastening regions 46 for attachment to the instrument panel 26, e.g., with springs, bolts, etc. The housing 14 may be adjustable relative to the instrument panel 26 for adjustment by the occupant, e.g., up-down adjustment and extension/retraction relative to the instrument panel 26.

The housing 14 includes a first terminus 48 and a second terminus 50 disposed opposite the first terminus 48. The first shaft 18 may extend from the housing 14 beyond the first terminus 48, and the second shaft 20 may extend from the housing 14 beyond the second terminus 50. The second terminus 50 faces the wedge 22 and the steering wheel 34, and the first terminus 48 may face the instrument panel 26.

As set forth above, the housing 14 defines the bore 16. The bore 16 may extend through the first terminus 48 and the second terminus 50. The bore 16 of the housing 14 may have a cylindrical circumference or a circumference of any suitable shape. The first shaft 18 and the second shaft 20 may be rotatable relative to the housing 14. Specifically, the first shaft 18 and the second shaft 20 may be supported by the housing 14 in any suitable fashion to allow for relative rotation between the shafts 18, 20 and the housing 14, e.g., bearings, etc.

At least a portion of the housing 14, for example the second terminus 50, may be formed of a carbon fiber composite, for example. The carbon fiber composite may include chopped carbon fiber impregnated in an epoxy matrix. As another example, at least a portion of the housing 14 may be formed of metal, for example, aluminum, steel, magnesium, etc. The housing 14 may be formed of a single type of material, or, alternatively, components of the housing 14 may be formed of different types of material. The material of the housing 14 may influence the energy absorbability of the steering column assembly 10 in the second stage of energy absorption. The material of the housing 14, e.g., the material of the second terminus 50, may be selected to tune the energy absorbability of the steering column assembly 10.

As set forth above, the wedge 22 is fixed to the second shaft 20. Specifically, the wedge 22 may define a wedge bore 52 extending along the axis A and receiving the second shaft 20 in the wedge bore 52 along the axis A. However, the wedge 22 may be disposed in any suitable location.

The wedge 22 is disposed between the steering wheel support 36 and the housing 14. The wedge 22, for example, includes a first end 54 and a second end 56 spaced from the first end 54 along the axis A. The first end 54 faces the steering wheel support 36 and the second end 56 faces the housing 14. The first end 54 of the wedge 22 may, for example, abut the steering wheel support 36 such that the steering wheel support 36 forces the wedge 22 toward the housing 14 as the first shaft 18 and the second shaft 20 move toward the retracted position. The wedge 22 may be fastened, e.g., by pinning, etc., to the steering wheel support 36 and/or to the second shaft 20.

As set forth above, the wedge 22 is movable with the second shaft 20 as the first shaft 18 and second shaft 20 move toward the retracted position. As the wedge 22 moves with the second shaft 20 toward the retracted position, the wedge 22 moves from a disengaged position spaced from the housing 14 to an engaged position contacting the housing 14.

The wedge 22 is in the disengaged position, i.e., spaced from the housing 14, in typical operation of the vehicle 12, e.g., in the absence of an impact from the occupant. A distance of the wedge 22 from the housing 14 in the disengaged position may be designed to tune the energy absorption during the first stage of energy absorption. For example, the distance of the wedge 22 from the housing 14 in the disengaged position may be 100 mm. As another example, the further the wedge 22 in the disengaged position is spaced from the housing 14, the more the first shaft 18 and the second shaft 20 telescopically retract relative to each other, and the more friction is generated to dissipate the impact force F, prior to the wedge 22 engaging the second terminus 50 of the housing 14.

The wedge 22 is in the engaged position when the first shaft 18 and the second shaft 20 telescopically retract relative to each other and the wedge 22 moves toward the housing 14 and engages the second terminus 50 of the housing 14. For example, in the engaged position, the wedge 22 extends into and engages the cylindrical circumference of the second terminus 50. The wedge 22 is configured to deform the housing 14 upon engaging the housing 14. For example, the wedge 22 may deform the second terminus 50 away from the axis A, e.g., by bending, peeling, splitting, etc., as shown in FIG. 3C. As such, in the second stage of energy absorption, the engagement of the wedge 22 and the second terminus 50 of the housing 14 absorbs force F generated by the occupant impacting the steering column assembly 10. In the second stage of energy absorption, friction generated from the telescopic retraction of the first shaft 18 and the second shaft 20 relative to each other may also absorb force F generated by the occupant impacting the steering column assembly 10.

The wedge 22 may be conical or have any suitable shape. The wedge 22 may include ribs 58. The ribs 58 may, for example, extend along the axis A. The wedge 22 may taper along the axis A toward the second end 56. For example, the ribs 58 may taper along the axis A toward the second end 56. The wedge 22 may be formed of any suitable material such as metal, e.g., aluminum, steel, etc.

As set forth above, the steering column assembly 10 absorbs energy in two stages during the occupant impact of the steering column assembly 10. During the first stage of energy absorption, the first shaft 18 and the second shaft 20 telescopically retract relative to each other, while the wedge 22, initially spaced from the housing 14, moves toward the housing 14. In the first stage of energy absorption, the friction generated between the first shaft 18 and the second shaft 20 as each telescopically retracts relative to each other absorbs the energy from the occupant impact of the steering column assembly 10. Subsequently, when the wedge 22 engages the second terminus 50 of the housing 14, in the second stage of energy absorption, the wedge 22 deforms the material of the second terminus 50, while the first shaft 18 and the second shaft 20 continue to telescopically retract relative to each other to generate the friction. In the second stage of energy absorption, therefore, the material deformation by the wedge 22 and the friction generated between the first shaft 18 and the second shaft 20 absorb the energy from the occupant impact of the steering column assembly 10. The two stage energy absorbability of the steering column assembly 10 cushions the impact of the occupant against the steering column assembly 10 and increases the amount of energy the steering column assembly 10 can absorb.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A steering column assembly comprising:
   a housing defining a bore extending along an axis;
   a first shaft disposed in the bore;
   a second shaft telescopically engaged with the first shaft and movable along the axis relative to the housing; and
   a wedge fixed to the second shaft and spaced from the housing;
   wherein the wedge is movable toward the housing when the first shaft and the second shaft telescopically retract relative to each other;
   wherein the wedge is configured to deform the housing when the first shaft and the second shaft telescopically retract.

2. The steering column assembly as set forth in claim 1, further comprising a steering wheel support fixed to the second shaft and spaced from the housing with the wedge disposed between the steering wheel support and the housing.

3. The steering column assembly as set forth in claim 2, wherein the second shaft has a stud extending from the steering wheel support and configured to support a steering wheel.

4. The steering column assembly as set forth in claim 3, wherein the wedge includes an end facing the housing and tapering toward the housing.

5. The steering column assembly as set forth in claim 4, wherein the wedge includes another end facing the steering wheel support.

6. The steering column assembly as set forth in claim 1, wherein the housing has a terminus facing the wedge, and the wedge is configured to engage the terminus.

7. The steering column assembly as set forth in claim 1, wherein the wedge includes an end facing the housing and tapering toward the housing.

8. The steering column assembly as set forth in claim 1, wherein the wedge is ribbed.

9. The steering column assembly as set forth in claim 1, wherein the wedge is formed of metal.

10. The steering column assembly as set forth in claim 1, wherein the housing is formed of a carbon fiber composite.

11. The steering column assembly as set forth in claim 1, wherein the wedge is conical.

12. The steering column assembly as set forth in claim 1, wherein the housing is deformable.

13. The steering column assembly as set forth in claim 1, wherein at least one of the first shaft and the second shaft has a shaft bore receiving the other of the first shaft and the second shaft.

14. The steering column assembly as set forth in claim 13, wherein the first shaft and the second shaft are frictionally engaged in the shaft bore.

15. The steering column assembly as set forth in claim 1, wherein the wedge is movable from a disengaged position spaced from the housing to an engaged position contacting the housing.

16. The steering column assembly as set forth in claim 15, wherein the bore includes a cylindrical circumference and the wedge extends into and engages the cylindrical circumference in the engaged position.

17. The steering column assembly as set forth in claim 1, wherein the wedge is disposed on the axis.

18. A steering column assembly comprising:
    a housing defining a bore extending along an axis;
    a first shaft disposed in the bore;
    a second shaft telescopically engaged with the first shaft and movable along the axis relative to the housing; and
    a wedge fixed to the second shaft and spaced from the housing;
    wherein the housing is deformable.

19. The steering column assembly as set forth in claim 18, wherein the wedge is movable from a disengaged position spaced from the housing to an engaged position contacting the housing.

20. A steering column assembly comprising:
    a housing defining a bore extending along an axis;
    a first shaft disposed in the bore;
    a second shaft telescopically engaged with the first shaft and movable along the axis relative to the housing; and
    a wedge fixed to the second shaft and spaced from the housing;
    wherein the wedge is ribbed.

* * * * *